United States Patent
Böshagen

[15] 3,692,795
[45] Sept. 19, 1972

[54] 3-AMINO-ISOTHIAZOLES, DERIVATIVES THEREOF AND PROCESSES FOR THE PRODUCTION THEREOF

[72] Inventor: Horst Böshagen, Haan, Germany

[73] Assignee: Farbenfabriken Bayer Aktiengesellschaft, Leverkusen, Germany

[22] Filed: Sept. 12, 1969

[21] Appl. No.: 857,580

[30] Foreign Application Priority Data

Sept. 17, 1968 Germany..........P 17 95 344.5

[52] U.S. Cl. ......260/305, 260/306.8 F, 260/306.8 A, 260/327 R, 424/270
[51] Int. Cl. .............................................C07d 91/46
[58] Field of Search.....................................260/304

[56] References Cited

OTHER PUBLICATIONS

Fries et al., Chem. Abstracts, 21:26928 (1927).
Goerdeler et al., Chem. Abstracts, 58:13946g (1963).
Stolle et al., Chem. Abstracts, 20:7636 (1926).

Primary Examiner—Alex Mazel
Assistant Examiner—R. J. Gallagher
Attorney—Jacobs & Jacobs

[57] ABSTRACT

3-Amino-isothiazoles and derivatives thereof of the formula:

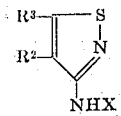

or a salt thereof, wherein $R^2$ and $R^3$ are the same or different and are hydrogen, unsubstituted or substituted aralkyl, unsubstituted or substituted aryl or an unsubstituted or substituted aliphatic moiety, or $R^2$ and $R^3$ are both alkyl linked together to form an anellated five- to seven-membered unsaturated or saturated, unsubstituted or substituted ring system, X is hydrogen or —CO—$R^1$, and $R^1$ is unsubstituted or substituted aralkyl, unsubstituted or substituted aryl or an unsubstituted or substituted aliphatic moiety, are produced by reacting a compound of the formula:

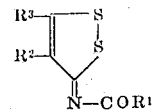

wherein $R^1$, $R^2$, and $R^3$ are as above defined, or a salt thereof, with at least a twice-molar quantity of hydroxylamine in the presence of a water-miscible organic solvent at an elevated temperature, and the N-acylamines thus formed are optionally hydrolyzed, optionally without intermediate isolation.
The 3-amino-isothiazoles and derivatives so produced are useful for their fungicidal activity and may be used in treating humans, animals and plants against various fungal infections.

6 Claims, No Drawings

3-AMINO-ISOTHIAZOLES, DERIVATIVES THEREOF AND PROCESSES FOR THE PRODUCTION THEREOF

The present invention is concerned with 3-amino-isothiazoles, their derivatives and salts thereof as well as processes for their production.

According to the prior art, only 5-phenyl-3-amino-isothiazole [Chem. Ber. 96, 944 (1963)] and 3-amino-1,2-benzisothiazole [Ber. Dtsch. Chem. Ges. 58, 2098 (1925)] are known.

It has now been discovered that various 3-amino-isothiazoles, derivatives thereof and salts thereof of the formula:

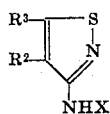

or a salt thereof, wherein $R^2$ and $R^3$ are the same or different and are hydrogen, unsubstituted or substituted aralkyl, unsubstituted or substituted aryl or an unsubstituted or substituted aliphatic moiety, or $R^2$ and $R^3$ are both alkyl linked together to form an anellated five- to seven-membered unsaturated or saturated, unsubstituted or substituted ring system, X is hydrogen or —CO—$R^1$, and $R^1$ is unsubstituted or substituted aralkyl, unsubstituted or substituted aryl or an unsubstituted or substituted aliphatic moiety, are obtained when a compound of the formula:

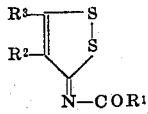

wherein $R^1$, $R^2$, and $R^3$ are as above defined, are reacted with at least a twice-molar quantity of hydroxylamine, in the presence of a water-miscible organic solvent, at an elevated temperature, and the N-acylamines thus formed are optionally hydrolyzed, optionally without intermediate isolation.

The compounds of the present invention are useful for the fungicidal activity they exhibit and thus may be used in treating humans and animals for fungal infections and may also be used to treat plants for infections pathogenic to plant life.

Preferred compounds according to the present invention are those of Formula (II), wherein $R^2$ and $R^3$ are the same or different and are unsubstituted or substituted aralkyl, unsubstituted or substituted aryl, an unsubstituted or substituted aliphatic moiety, or when $R^2$ is as above defined, $R^3$ can be hydrogen or when $R^3$ is unsubstituted or substituted aryl or an unsubstituted or substituted aliphatic moiety, $R^2$ can be hydrogen, or $R^2$ and $R^3$ are both alkyl linked together to form an anellated five- to seven-membered unsaturated or saturated, unsubstituted or halogen, alkyl, alkoxy or nitro substituted ring system, provided that if $R^2$ and $R^3$ are linked to form a benzene ring, said benzene ring is substituted by at least one halogen, alkyl, alkoxy or nitro, X is hydrogen or —CO—$R^1$, and $R^1$ is unsubstituted or substituted aralkyl, unsubstituted or substituted aryl or an unsubstituted or substituted aliphatic moiety, and wherein the salts are inorganic acid salts.

When any of $R^1$, $R^2$, or $R^3$ are an unsubstituted or substituted aliphatic moiety, it is preferred that such moiety be a straight or branched chained one of one to eight carbon atoms and preferably of one to four carbon atoms. The preferred substituents are halogen, particularly fluorine, chlorine or bromine, or alkoxy, preferably of one to four carbon atoms. The aliphatic moieties include those having double or triple bonds, that is they embrace not only the alkyls but the alkenyls and the alkinyls of one to eight carbon atoms and especially one to four carbon atoms which may be substituted as above noted. In addition, the aliphatic moieties include cycloaliphatic moieties of five to seven carbon atoms in the ring.

When any of $R^1$, $R^2$, or $R^3$ is an unsubstituted or substituted aralkyl, it is preferred that the alkyl portion thereof be of one to four carbon atoms and preferably one to two carbon atoms. It is preferred that the aryl portion preferably contain a phenyl radical. The preferred substituents are halogen, especially fluorine, chlorine or bromine, lower alkyl, preferably of one to four carbon atoms or lower alkoxy also preferably of one to four carbon atoms.

When any of $R^1$, $R^2$, or $R^3$ are unsubstituted or substituted aryl, it is preferred that such aryl moieties contain up to 10 carbon atoms in the ring system. The preferred aryl moiety is phenyl which can carry up to two identical or different substituents. The preferred substituents are halogen, preferably fluorine, chlorine or bromine, alkyl preferably of one to four carbon atoms or alkoxy of one to four carbon atoms.

When both $R^2$ and $R^3$ are alkyl, they may be linked together to form an anellated ring. Such anellated ring may be substituted by one or more halogen atoms, i.e., fluorine, chlorine, bromine or iodine, alkyl preferably of one to four carbon atoms, alkoxy preferably of one to four carbon atoms or nitro. It is preferred that when a nitro group is present that only one such nitro group should be present on the anellated ring.

The 3-acylimino-3H-1,2-benzodithioles (I) used as starting materials are either known or can be obtained by known processes [Chem. Ber. 101, 2472 (1968)].

The process according to the present invention may be illustrated by the following reaction mechanism:

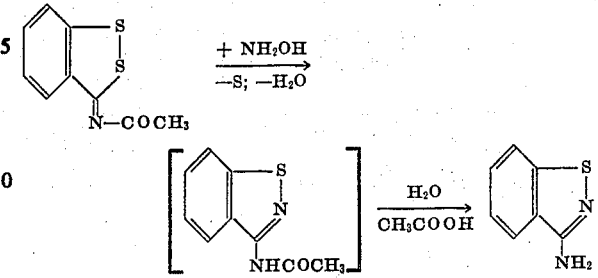

The process according to the present invention is generally carried out at an elevated temperature of from about 30°C to about 120°C, and preferably from about 50°C to 100°C.

As solvents there may be used water-miscible organic solvents, such as lower alcohols, dioxane and tetrahydrofuran; dimethyl formamide or dimethyl sulphoxide can however also be used.

The hydroxylamine used in the reaction is preferably liberated in the reaction mixture by addition to the necessary quantity of a commercially available salt (preferably hydrochloride) of the necessary amount of a base (sodium hydroxide, potassium hydroxide, sodium acetate, etc.).

The process is in general so carried out that, for example, 1 mole of hydroxylamine HCL-salt is dissolved hot in about 2½ l. of ethanol and mixed with one mole of base, for example sodium acetate (anhydrous), and 0.5 mole of a 3-acetimino-3H-1,2-dithiol, and the mixture heated at boiling point for about 1 to 2 hours with stirring.

It is possible for one to proceed so that the N-acyl compound produced is next cooled, filtered free from common salt and crystallized-out sulphur, isolated and finally hydrolyzed. Optionally, however, it may be expedient after completion of the reaction and the formation of the N-acyl compound to mix the reaction mixture directly with the customarily used amount of excess acid such as concentrated hydrochloric acid, sulphuric acid, etc. and to proceed with the hydrolysis at an elevated temperature, preferably at reflux temperature of the mixture.

After the hydrolysis has been completed, the amine is liberated in the usual way by addition of an alkali or alkaline earth metal hydroxide and isolated in a manner per se known for example by extraction with a solvent such as ether of benzene. The working-up of the initial products thus follows in accordance with known procedures.

The process of the present invention must be regarded as decidedly surprising, because the splitting off of the disulphide group was to be expected in the described reaction, while the formation of the 3-amino-isothiazoles could, on the other hand, not be predicted.

The 3-amino-isothiazoles, derivatives and salts thereof of the present invention are useful not only for the fungicidal activity which they exhibit, which is useful in the treatment of fungi pathogenic to humans and animals, as well as the fungicidal activity which they exhibit against fungi pathogenic to plants, but the compounds of the present invention are also useful as intermediates in the preparation of plant protection agents.

Table 1 below shows by way of example the minimal inhibitory concentrations of a few representative compounds of the present invention against certain representative fungi. The experiments were carried out both in the presence and absence of serum.

TABLE 1

| Compound | Fungus species | Minimal inhibition concentration in γ/ml of nutrient solution | |
|---|---|---|---|
| | | without serum | with serum |
| 6-chloro-3-amino-1,2-benzisothiazole | Trichophyton mentagrophytes | 10 | 10 |
| | Candida albicans | 20 | 40 |
| | Penicillium commune | 20 | |
| 3-acetamino-1,2-benzisothiazole | Trichophyton mentagrophytes | 40 | 40 |
| 5-chloro-7-methoxy-3-acetamine-4-methyl-1,2-benzisothiazole | Trichophyton mentagrophytes | <4 | 40 |
| | Candida albicans | 40 20γ; 50% inhibition | 100 40γ; 50% inhibition |

The following non-limitative examples in particular illustrate the present invention.

EXAMPLE 1 a. 13.9 (0.20 mol) of hydroxylamine. HCl (finely powdered) are dissolved hot in 500 ml ethanol and 16.4 g (0.20 mol) of sodium acetate (anhydrous) together with 20.9 g (0.10 mol) of 3-acetylimino-3H-1,2benzodithiol are added. The mixture is boiled under reflux for 1.5 hours with stirring. After this time the mixture is cooled, precipitated sodium chloride and crystallized-out sulphur removed by suction filtration and the filtrate evaporated in vacuo. The 3-acetamino-1,2-benzisothiazole formed crystallizes out on rubbing. The compound forms yellowish prisms on recrystallization from ethanol.

M.p. 154°C Yield: 16.5 g (86 percent of theory).

b. 19.2 g (0.1 mol) of 3-acetamino-1,2-benzisothiazole are taken up in 250 ml ethanol and 250 ml concentrated sulphuric acid, and the mixture boiled for one hour under reflux with stirring. A nearly clear solution is obtained, which is filtered while hot and evaporated in vacuo to dryness. The base is liberated from the hydrochloride thus obtained by treatment with dilute NaOH and taken up in ether. 10.5 g (70 percent) of 3-amino-1,2-benzisothiazole are obtained after drying and evaporation in vacuo. M.p. 114°C.

EXAMPLE 2

13.9 g (0.20 mol) of hydroxylamine. HCl (finely powdered) are dissolved hot in 500 ml ethanol and 16.4 g (0.20 mol) of sodium acetate (anhydrous) together with 20.9 g (0.10 mol) of 3-acetylimino-3H-1,2-benzodithiol added. The mixture is boiled for 1.5 hours under reflux with stirring, and after this time mixed with 250 ml concentrated sulphuric acid and heated at boiling point for another hour.

The reaction mixture is mixed with carbon, filtered hot, and the filtrate evaporated to dryness in a water-pump vacuum. After treatment with excess sodium hydroxide (cca. 10 percent aqueous solution) the split-off amine is taken up in ether and the ethereal solution dried. After removal of the solvent 3-amino-1,2-benzisothiazole is obtained in yield of 75 percent of theory.

M.p. 114°C.

In a manner analogous to that set forth in Examples 1 and 2, the following compounds may be prepared from the following starting materials:

6-Chloro-3-acetamino-1,2-benzisothiazole, M.p. 177°C, from 6-chloro-3-acetylimino-3H-1,2-benzodithiol 5-Chloro-7-methoxy-3-acetamino-4-methyl-1,2-benzisothiazole, M.p. 222°C, from 5-chloro-7-methoxy-3-acetylimino-4-methyl-3H-1,2-benzodithiol 3-Acetamino-5,7-dimethyl-1,2-benzisothiazole, colorless prisms (ethanol), m.p. 188°C, from 3-acetylimino-5,7-dimethyl-3H-1,2-benzodithiol.

5-Nitro-3-acetamino-1,2-benzisothiazole, light yellow prisms (dioxane), m.p. 226°C (Subl.), from 5-nitro-3-acetyl-imino-3H-1,2-benzodithiol.

5-Phenyl-3-acetamino-isothiazole, m.p. 195°C (Subl.), colorless prisms, from 5-phenyl-3-acetylimino-3H-1,2-dithiol.

4,5,6,7-Tetrahydro-3-acetamino-1,2-benzisothiazole, m.p. 118°C, from 4,5,6,7-tetrahydro-3-acetylimino-3 H-1,2-benzodithiol.

5,6-Dihydro-4H-3-acetamino-cyclopenta-[d]-isothiazole, colorless prisms (methanol), m.p. 126°C, from 5,6-dihydro-4H-3-acetylimino-cyclopenta-[d]-3 H-1,2-dithiol.

4,5-Dimethyl-3-acetamino-isothiazole, m.p. 119°C, from 4,5-dimethyl-3-acetylimino-3H-1,2-dithiol.

5-Methyl-3-acetamino-isothiazole, m.p. 160°C (Subl.), from 5-methyl-3-acetylimino-3H-1,2-dithiol.

4-Methyl-3-amino-isothiazole, colorless crystals, m.p. 121°C (Subl.), from 4-methyl-3-acetylimino-3H-1,2dithiol.

5-Methyl-3-amino-isothiazole. HCl, colorless crystals, m.p. 142°C from 5-methyl-3-acetylimino-3H-1,2-dithiol.

3-Amino-5,7-dimethyl-1,2-benzisothiazole, m.p. 143°C, from 3-acetylimino-5,7-dimethyl-3H-1,2-benzodithiol.

6-Chloro-3-amino-1,2-benzisothiazole, m.p. 156°C (Subl.), from 6-chloro-3-acetylimino-3H-1,2-benzodithiol.

5-Chloro-7-methoxy-3-amino-4-methyl-1,2-benzisothiazole. HCl, m.p. 186°C (Subl.), from 5-chloro-7-methoxy-3-acetyl-imino-4-methyl-3H-1,2-benzodithiol, 4,5,6,7-Tetrahydro-3-amino-1,2-benzisothiazole, m.p. 177°C, from 4,5,6,7-tetrahydro-3-acetylimino-3H-1,2-benzodithiol.

5,6-Dihydro-4H-3-amino-cylcopenta-[d]-isothiazole, colorless prisms, m.p. 116°C, from 5,6-dihydro-4H-3-acetylimino-cyclopenta-[d]-3H-1,2dithiol.

4,5-Dimethyl-3-amino-isothiazole, colorless prisms, m.p. 99°C, from 4,5-dimethyl-3-acetylimino-3H-1,2-dithiol.

What is claimed is:

1. A compound selected from the group consisting of an isothiazole derivative of the formula:

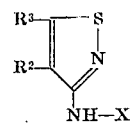

wherein X is —$COR^1$ in which $R^1$ is alkyl of one to eight carbon atoms, and $R^2$ and $R^3$ together with the carbon atoms to which they are attached are benzo substituted by up to three substituents selected from the group consisting of halogeno, alkyl of one to four carbon atoms, alkoxy of one to four carbon atoms and nitro.

2. The compound according to claim 1 which is 3-acetamino-1,2-benzisothiazole.

3. The compound according to claim 1 which is 6-chloro-3-acetamino-1,2-benzisothiazole.

4. The compound according to claim 1 which is 5-chloro-7-methoxy-3-acetamino-4-methyl-1,2-benzisothiazole.

5. The compound according to claim 1 which is 3-acetamino-5,7-dimethyl-1,2-benzisothiazole.

6. The compound according to claim 1 which is 5-nitro-3-acetamino-1,2-benzisothiazole.

* * * * *